July 12, 1927. Re. 16,675

N. Z. SMITH

ATTACHMENT FOR VAULT DOORS

Original Filed April 17, 1922 2 Sheets-Sheet 1

Witness
L. F. Sandberg

Inventor
Noble Z. Smith
By Baird & Freeman Attorneys

July 12, 1927. N. Z. SMITH Re. 16,675
ATTACHMENT FOR VAULT DOORS
Original Filed April 17, 1922 2 Sheets-Sheet 2
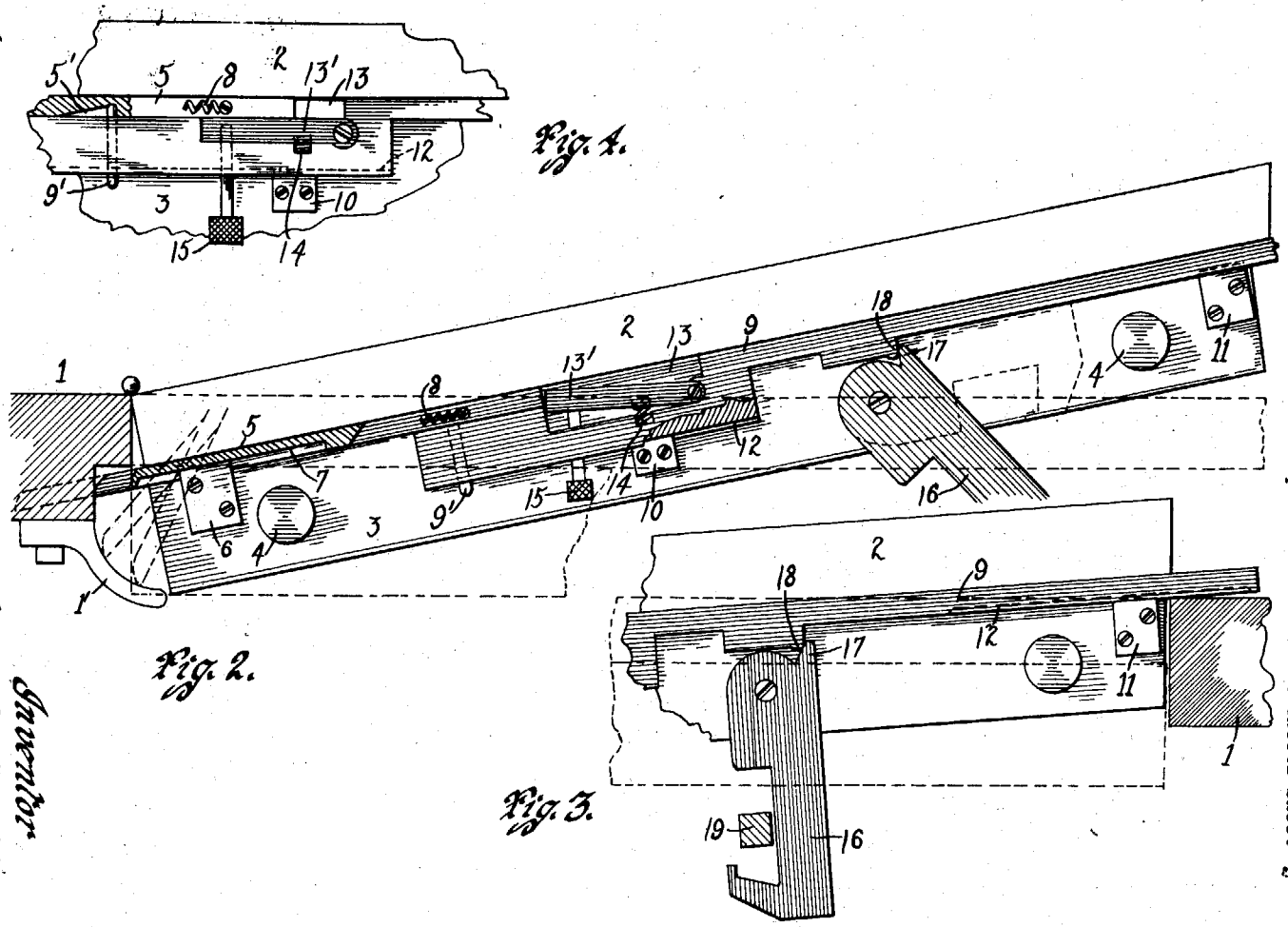
Witness
L. F. Sandberg
Inventor
Noble Z. Smith
by Bair & Freeman Attorneys Reissued July 12, 1927. Re. 16,675

UNITED STATES PATENT OFFICE.

NOBLE Z. SMITH, OF CHAMPAIGN, ILLINOIS, ASSIGNOR TO M. L. CANOTT AND J. E. HALL, BOTH OF SAN FRANCISCO, CALIFORNIA.

ATTACHMENT FOR VAULT DOORS.

Original No. 1,514,866, dated November 11, 1924, Serial No. 553,412, filed April 17, 1922. Application for reissue filed November 8, 1926. Serial No. 147,163.

This invention pertains to an attachment for vault doors.

An object of my invention is to provide means by which the door of a bank vault or other similar place may be prevented, on occasions, from being wholly closed and by which in the attempt to close said door will be automatically locked or latched in its partially closed position and make immovable from the outside.

Another object is to provide an attachment for the door of a bank vault having for its purpose to aid in frustrating attempted banditry, and by which the operatives in place having a vault may be safe from molestation after entering said vault, and yet may use the said vault as a vantage point from which, by the use of firearms, to deal with outlawry and prevent loss of valuables.

Still another object is that of so arranging and organizing parts of the door of a vault that operatives of the institution in which the vault may be installed, whether having taken refuge in said vault or having been forced into it, may have control of the door preventing its being wholly closed or of being swung open from the outside after an attempt to close it, to the end that from within the vault such parts may be operated to permit the door to be opened for giving such operatives an advantage in the use of firearms, while admitting of quickly closing and latching said door in an ajar position.

To the end that the structure used and the purpose thereof may be more fully understood, I have provided the accompanying drawings forming part thereof, it being understood that I do not limit myself to the structure illustrated since various changes are possible while still within the scope of the invention and the claims herein.

Figure 2 is a plan of the upper edge of a vault-door with my invention shown installed on a ledge thereof.

Figure 3 is a similar figure showing certain parts in different positions from those shown in Figure 2.

Figure 4 is also a plan of the top edge of the door showing altered positions of parts illustrated in Figure 2.

Figure 1:
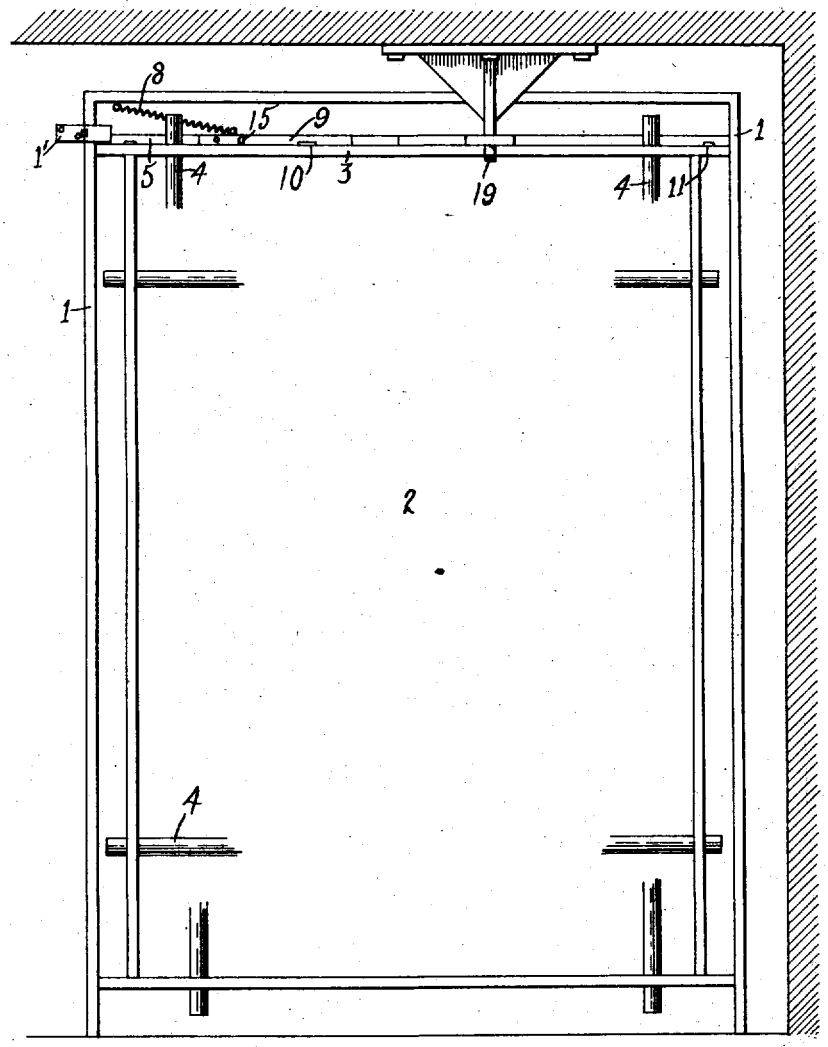
Figure 1 is an elevation of the inner side of a vault-door showing my invention installed thereon.

Parts of the front wall of a vault are designated in Figures 1, 2 and 3 by the character 1, which constitute the door-jamb, while 2 is the vault-door, 3 being a ledge at the top of the latter through which the usual locking bolts 4 extend.

Figure 5:
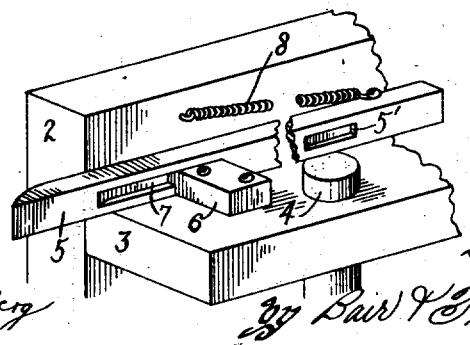
Figure 5 shows, in perspective, part of the door and parts of my invention mounted thereon.

Lying in the angle formed by the door 2 and the ledge 3, Figure 5 especially, is a bar 5 adapted to shift in the direction of its length. Said bar may be placed elsewhere on said ledge but the position shown is a convenient one since a natural guide is created by these parts. As a convenient manner of retaining the bar in position while permitting the longitudinal movement referred to, a block 6 is secured upon the ledge 3, an extension thereof lying within a groove 7 in said bar.

One end of the latter extends beyond the hinged edge of the door and abuts upon the door-jamb, being there held elastically by suitable means such, for example, as a spring 8 attached at one end of the door and at the other to the said bar.

A slide 9 is likewise placed in the angle formed by the door 2 and the ledge 3, the same adapted to project from or to be extended beyond the opposite edge of the door.

Said slide at its other end lies against the bar 5, forming a guide therefor, there being blocks 10 and 11, for example, on the ledge which enter grooves 12 in the slide serving to retain the latter in place while permitting an endwise movement thereof to be explained.

13 is a recess in the slide into which the bar 5 is permitted to pass at times, there being a trigger 13′ within the recess pivoted to said slide, its free end extending in the general direction of the said bar 5. A spring 14 serves to hold the trigger elastically in the path of the bar while a control member 15 admits of manually moving the same out of said path, or from the position of said trigger in Figure 2 to that shown in Figure 4, to permit the bar to move behind it into said recess.

5′ is a recess in the bar 5 into which a pin 9′ carried by and slidably within the slide 9 is adapted to enter, said recess having an inclined inner wall surface for ejecting the pin.

Pivotally mounted upon the ledge 3 is a latch 16 which in the present instance is adapted to swing in a horizontal plane and may occupy one of two extreme positions, i. e. that shown by dotted lines in Figure 2 and as in Figure 3, but in use moving between these two positions as will appear presently.

Said latch has a projecting heel portion 17 near its pivoted end with which an extension 18 of the slide 9 is adapted to engage, whereby in the longitudinal shifting movement of the latter said latch will be swung upon its pivot.

Depending from the ceiling or other convenient part of the interior of the vault, is a stop or keeper 19, Figures 1 and 3, with which said latch is adapted to cooperate when the door is moved toward its closed position under circumstances now to be disclosed.

Normally, the parts lie in the positions shown in Figure 2 whether the door is standing ajar or wide open, but when wide open (not shown) the bar 5 will be extended from the door-edge still farther, due to the pull of the spring 8 and will rest upon a cam 1′ on the wall 1, which cam will serve to gradually move the bar by forcing it lengthwise toward the trigger.

When and as the door is moved in an attempt to close it, either by the bandits to imprison persons driven into the vault, or by persons who may have entered for safety, the bar 5 will be forced against and cause the trigger 13′ to be shifted with it together with the slide 9. The latter will be thereby projected at its outer end beyond the edge of the door to strike the jamb as in Figure 3, preventing the door being closed. As this action occurs the latch 16 will have been swung from the dotted line position, Figure 2 to that shown in Figure 3 against the depending stop or keeper 19.

Those from without are thus now unable to either tightly close the door due to the projecting slide 9 which, of course, cannot be inwardly shifted, nor can they open the door due to the fact that the latch 16 will engage said bar or keeper 19 and prevent it. Neither can the door be opened sufficiently to permit the entrance of any instrument for reaching the said latch 16, nor could the latch be moved, even if reached, to disengage it from the said keeper from the fact that the heel portion 17 lies against the now immovable slide 9 held by the bar 5 and trigger 13′.

However, a person within the vault when opportunity permits, may move the trigger away from bar 5 to permit it to move past the latter, Figure 4, whereupon the slide 9 may be shifted by the latch, as that member is moved away from the keeper 19, sufficiently to permit the door to be opened.

As danger threatens, the latch is thrown against the keeper and the slide moved outwardly again to permit the trigger to again take up its position behind the bar 5.

Thus it is seen that those from without are at the mercy of firearms used by those protected within the vault. An advantage also in the use of my device is that persons cannot be locked within a closed vault and thus be in danger of suffocation, as often results.

When locking the vault for the night the trigger 13′ is withdrawn from behind the bar 5, as already explained, so that the latter may pass behind it. Now by pushing the pin 9′ into the recess 5′, as shown in Figure 4, the bar is held behind the trigger in opposition to the pull of the spring 8 preventing the said trigger being released. With the slide 9 withdrawn so that its end is inward from the edge of the door the latter may now be closed, the bar 5 being naturally and necessarily pushed farther behind the trigger during which action the pin is forced outward and out of the recess 5′ so that when the door is again opened for the day's business the bar can move from behind the trigger, the device being automatically set ready for an emergency.

I am unaware of an attachment for a vault door having the aim and purpose outlined herein, and therefore having set forth a type of mechanism for accomplishing these aims, I claim:

1. The combination with the mounted door of a vault and the door-jamb, of mechanism movable in and during the act of moving the door to its closed position, the same adapted to engage at one end a relatively immovable part during said act whereby to carry the other end of said mechanism between the door-jamb and an edge of the door for preventing entirely closing the latter.

2. The combination with the door and a door-jamb of a vault, of mounted mechanism operated automatically in the act of moving the door to its closed position by contact with a relatively stationary portion for projecting said mechanism between an edge of the door and said door-jamb, a keeper within the vault, and a latch operated automatically by said mechanism to engage said keeper.

3. The combination with the door and door-jamb of a vault, of mounted mechanism inward from the outer face of the door operated automatically in and due to movement of the latter to a partially closed position for moving a part of said mechanism between an edge of the door and the door-jamb, preventing said door being entirely closed, and means within the vault to automatically latch the door and prevent its being opened from the outside when moved to said partially closed position.

4. The combination with the door and door-jamb of a vault, of mechanism carried on the inner side of the door mounted to move parallel to the plane thereof including a part adapted to engage the door-jamb at the hinged edge of the door and also including a part adapted to be projected from the opposite edge of the door when and as the door is moved toward its closed position, and means to automatically latch the door and prevent the movement thereof from the outside to open it when in a partially closed position.

5. The combination with the door and door-jamb of a vault, of two separate parts mounted on the door capable of movement relatively to each other and relative to said door, one of them normally and elastically abutting against the jamb at the hinged edge of the door, the other to be adapted to be projected beyond the other edge of said door to prevent entire closing of the door, a member adapted for operative engagement with both parts whereby movement of one will impart movement to the other, a latch operated by one of the parts in its movement, and a keeper within the vault with which the latch is adapted to engage when the door is stopped by the projecting part.

6. The combination with the door and door-jamb of a vault, of mechanism mounted on the door including a part adapted at one end to abut against the jamb, means to elastically hold the same against said jamb, a second part adapted for movement with respect to the first and a trigger pivoted on one of the parts adapted to operatively engage the other by which the movement of one will impart movement to the other, the trigger adapted to be moved to permit the parts to move relatively.

7. The combination with the door and door-jamb of a vault, of mechanism mounted on the door including a part adapted at one end to abut against the jamb, means to elastically hold the same against said jamb, a second part adapted for movement with respect to the first, and a trigger pivoted on one of the parts adapted to operatively engage the other by which the movement of one will impart movement to the other, the trigger adapted to be moved to permit the parts to move relatively, and means to control the elastically held part with respect to said trigger.

8. The combination with the door of a vault or other enclosure, of mounted mechanism adapted to be operated by the door in the act of moving said door toward its closed position to automatically project a part of such mechanism into the path of the said door to stop the same in an ajar position, and means to automatically latch the door in that position to prevent its being opened from the outside.

9. The combination with the door of a vault, of mounted mechanism adapted to be operated through the instrumentality of said door and including a part to be moved into the path of said door in an attempt to close the same to stop it in an ajar position, said part adapted to be moved manually relatively to the mechanism, and means to automatically latch the door after having been moved to such ajar position to prevent said door being swung open from the outside.

10. The combination with a door jamb and a movable door of a locking mechanism, comprising a keeper mounted on one of said first-named elements, a movable latch mounted on the other of said elements adapted to stand in operative or in inoperative position, said keeper and latch being adapted when the latch is in operative position to cooperate with each other for automatically engaging when the door is moved from open toward closed position for holding the door in slightly ajar position and means for moving the latch from inoperative to operative position when the door is moved from open toward closed position.

11. A locking device structure including the combination with a hinged door element and a door jamb element of a fixed member mounted on one of said elements, a latch movably mounted on the other element, and means for holding the latch in inoperative position incapable of cooperating with the fixed member for performing a locking function, said parts being mounted to coact with each other whereby when the door is given hinged movement, the latch is moved to position for cooperating with the fixed member, so that when the door is then moved toward closed position, the latching mechanism and keeper will engage for holding the door slightly ajar.

12. The combination of a door jamb member and a movable door member with a fixed element mounted on one of said members, with a movable element mounted on the other of said members adapted to be moved to operative or inoperative position, said movable element being arranged when in operative position to engage the fixed element when the door is moved from opening toward closed position for coacting therewith and locking the door in ajar position, and adjustable means for holding the movable member in its inoperative position.

13. The combination of a door-jamb member and a movable door member with a locking mechanism having a fixed element mounted on one of said members, a movable catch element mounted on the other of said members adapted when in operative position to engage with the fixed element when the door is moved toward closed position for holding the door ajar against opening or closing and movable means adapted when adjusted to one position to coact with the catch element to hold it in inoperative position, said mechanism being adapted to release said means when the door is moved from closed to open position for rendering it inoperative and permitting the movable catch element to move to operative position.

NOBLE Z. SMITH.